United States Patent
Dickson

[11] 4,364,265
[45] Dec. 21, 1982

[54] METHOD AND APPARATUS FOR OBTAINING AN EFFICIENTLY RUNNING INTERNAL COMBUSTION ENGINE

[76] Inventor: John Dickson, 3855 Valley Hill Rd., Bloomfield Hills, Mich. 48013

[21] Appl. No.: 314,762

[22] Filed: Oct. 26, 1981

[51] Int. Cl.$^3$ ............................................ G01M 15/00
[52] U.S. Cl. .................................................. 73/113
[58] Field of Search .................. 73/113; 123/478, 486, 123/416

[56] References Cited

U.S. PATENT DOCUMENTS 4,261,315  4/1981  Geiger et al. ........................ 123/478

FOREIGN PATENT DOCUMENTS 513291  6/1976  U.S.S.R. ................................ 73/113

Primary Examiner—Charles J. Myhre
Assistant Examiner—Andrew M. Dolinar
Attorney, Agent, or Firm—McGlynn and Milton

[57] ABSTRACT

A method of providing an efficiently running internal combustion engine including the steps of operating an engine at a constant rpm while increasing the torque load on the engine, measuring the torque value at predetermined intervals of the torque load to obtain a brake mean effective pressure for each of the intervals, and measuring the fuel consumption at the predetermined intervals. The common log of the brake mean effective pressure is plotted against the common log of the fuel consumption for each interval to obtain a straight line curve (10) which extends linearly with a constant first slope to a D-point coordinate (16) after which it continues at a different second slope. A straight line extension (20) is plotted having the first slope and extending upwardly from the D-point coordinate (16). The instant invention is characterized by controlling at least one of the fuel inputs to the engine and the spark timing so that the plot of the common log of the brake mean effective pressure against the common log of the value of the fuel consumption for the constant rpm falls on the straight line extension (20).

The instant invention further provides an internal combustion engine assembly including an engine, a fuel input mechanism for supplying fuel to the engine, and a spark-generating mechanism for igniting the fuel within the engine. The assembly is characterized by a control mechanism for controlling at least one of the fuel input mechanisms and the timing of the spark-generating mechanism at predetermined values which result in the substantially straight line plot of the common log of the brake mean effective pressure against the common log of the fuel consumption of the assembly extending linearly with a constant slope at the operating rpm.

3 Claims, 2 Drawing Figures

METHOD AND APPARATUS FOR OBTAINING AN EFFICIENTLY RUNNING INTERNAL COMBUSTION ENGINE

TECHNICAL FIELD

This invention relates to internal combustion engines and, more specifically, to a method of efficiently operating an internal combustion engine.

BACKGROUND ART

It is presently desirable to produce high mileage automobiles. Automobile manufacturers have attacked the problem of obtaining more miles per gallon of fuel by various methods. Automobiles have been made from lighterweight parts, bearings have been improved, and new lubricants have been fabricated. In regard to the internal combustion engine, manufacturers have been producing engines with fewer cylinders and having less horsepower. Also, it is desirable to run engines so that the engine does not produce obnoxious pollutants such as nitrous oxides.

A problem arises when it is desirable to obtain the peak efficiency of an internal combustion engine. Under test conditions, if the engine is operated at a constant rpm while the torque load on the engine is increased, then the engine reaches a point of peak apparent efficiency, beyond which the engine efficiency falls off significantly. Hence, the engine cannot be run efficiently at full load.

The instant invention provides a novel analysis of the above-described conditions and presents a method of operating the internal combustion engine efficiently when said engine is at full load and without producing obnoxious pollutants.

STATEMENT OF INVENTION AND ADVANTAGES

The subject invention relates to a method of providing an efficiently running internal combustion engine. The method includes the steps of operating an engine at a constant rpm while increasing the torque load on the engine and measuring the torque value at predetermined intervals to obtain a brake mean effective pressure (BMEP) for each of the intervals. The fuel consumption is measured at the predetermined intervals and the common log of the BMEP is plotted against the common log of the fuel consumption for each interval to obtain a straight line curve which extends linearly with a constant first slope to a D-point coordinate after which continues at a different second slope. A straight line extension is plotted having the first slope and extending upwardly from the D-point coordinate. The method is characterized by controlling at least one of the fuel inputs to the engine and the spark timing so that the plot of the common log of the BMEP against the common log of the value of the fuel consumption for the constant rpm falls on the straight line extension.

It has been found that when the engine fuel input and/or spark timing are adjusted accordingly, engine efficiency is increased between the engine load at the D-point and the full load capacity while producing minimum pollutants.

FIGURES IN THE DRAWINGS

A method in accordance with the present invention will now be described by way of example only, with reference to the accompanying drawings in which:

FIG. 1 is a schematic representation of a graph of the common log of the BMEP plotted against the common log of the fuel consumption of an internal combustion engine operated at a constant rpm; and FIG. 2 is a schematic representation of a graph of the common log of the BMEP plotted against the common log of the fuel consumption of an internal combustion engine operated at a series of constant rpms.

DETAILED DESCRIPTION OF THE DRAWINGS

Figure 1:
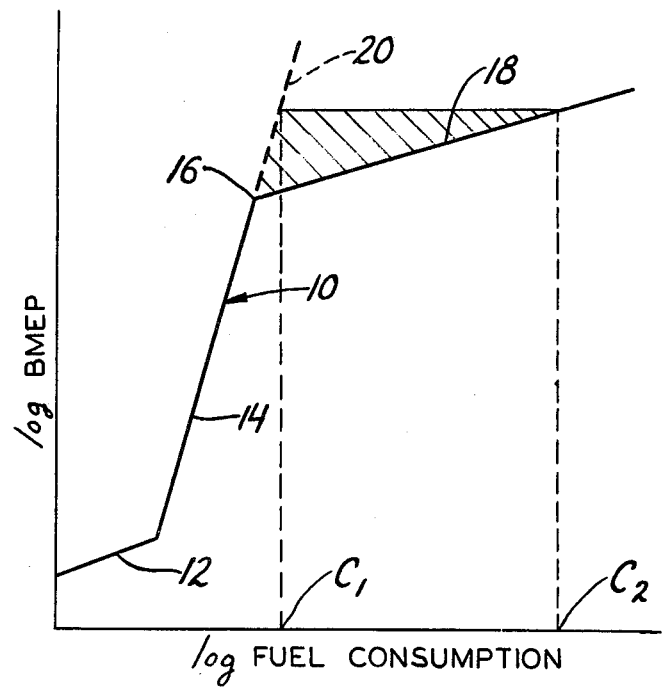
Figure 2:
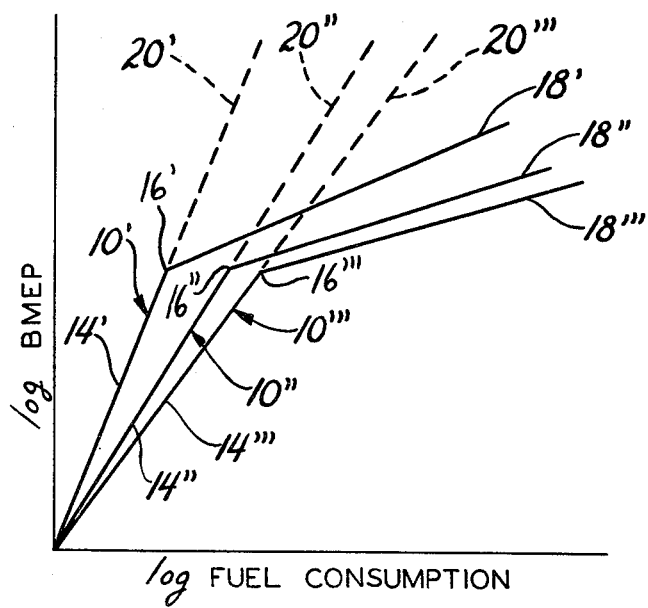

A method of providing an efficiently running internal combustion engine is generally shown by the graph in FIGS. 1 and 2. Although the invention has applications for diesel and natural gas-burning internal combustion engines, it is particularly suited for and will be described in connection with gasoline-burning internal combustion engines.

In accordance with the instant invention, a test engine is operated at a constant rpm over various engine loads. In other words, while the engine is run at a constant rpm, the torque load on the engine is increased. In practice, a dynamometer is used to determine the brake horsepower which is converted to the BMEP. The BMEP is equal to the indicated mean effective pressure multiplied by the mechanical efficiency of the particular engine tested. Accordingly, the following computation and solution derived therefrom can only be applied to the particular type of engine tested. Thusly, the torque value is measured at predetermined intervals of torque load to obtain a BMEP for each of the intervals. Concurrently, the fuel consumption is measured at each of the predetermined intervals.

As shown in FIG. 1, the common log of the BMEP is plotted against the common log of the fuel consumption for each interval to obtain a straight line curve, generally indicated at 10. The common or Briggsian logarithms are exponents of the base 10. The curve includes an initial portion 12 having a substantially shallow slope and a second portion 14 having a much steeper slope. The second portion 14 extends linearly with a constant slope to a D-point coordinate 16. After the D-point 16, a third portion 18 of the curve continues at a different more shallow slope.

It has been found that the D-point 16 represents the amount of fuel consumption where a significant amount of pollutants begin to form within the engine. More specifically, particular oxides of nitrogen are formed at the D-point 16. Other pollutants are also formed which are accompanied by combustion knock.

A straight line extension 20 of the second portion 14 of the straight line curve 10 is plotted having a slope equal to the second portion 14 of the curve 10 and extending upwardly from the D-point coordinate 16.

The instant invention is characterized by controlling at least one of the fuel inputs to the engine and spark timing so that the plot of the common log of the BMEP against the common log of the value of the fuel consumption for the constant rpm at which the engine is tested falls on the straight line extension 20. In other words, the instant invention provides a method of adjusting the injection or ignition of the fuel just before the engine reaches the D-point 16 so that the straight line plot 10 of the common log of the BMEP plotted against the common log of the fuel consumption will follow the straight line extension 20 and the fuel consumption decreases in value from point $C_2$ to $C_1$, as shown in FIG. 1. Under such conditions, it has been found that the maximum BMEP equals the maximum indicated mean effective pressure so that any change in the slope of the straight line extension 20 represents a change in the actual combustion of the engine cylinder. In other words, where the BMEP equals the indicated BMEP, the engine is running at peak efficiency. It has been determined that the change in combustion results in a 28 to 32 percent gain in efficiency at full load. It can further be computed that the shaded area between the straight line portion 18 and the straight line extension 20, shown in FIG. 1, represents the energy loss to pollution per cycle of the engine. Thusly, the gain in engine efficiency is accompanied by a decrease in emitted pollution therefrom.

It has been determined, in accordance with the instant invention that the normal engine loses energy due to the production of pollutants. As previously stated, these pollutants take the form of oxides of nitrogen which are combustion products of the spent fuel. It has been found that these pollutants form at the D-point 16, a point where a definite break occurs in the graphs of FIGS. 1 and 2. At the D-point, the temperature of combustion has reached a critical stage. In accordance with the instant invention, at each rpm that the engine operates, the spark and fuel consumption are retarded, thereby maintaining the operating temperature below the critical temperature at which the pollutants are formed. Since the D-point indicates such a definite break, engineers can easily test engines to determine where the pollutants begin to form.

As shown in FIG. 2, an engine can be operated at a series of constant rpms and the engine torque and fuel consumption measured at each rpm to derive a series of curves 10', 10'' and 10'''. Thusly, the proper fuel input and spark timing for an engine can be caluculated over a spectrum of engine speeds to obtain peak efficiency and minimum emitted pollutants for all engine speeds.

The BMEP can be measured, for example, as pounds per square inch and the fuel consumption as cubic millimeters fuel per cubic inch of cylinder volume.

The above-described method is applied to a single engine so that the engine can be operated efficiently over a spectrum of rpms. Thusly, the instant invention can be applied to different types of engines by testing the engines to obtain plots of the common log BMEP vs the common log of the fuel consumption for each particular engine.

The instant invention further provides an internal combustion engine assembly including an engine, such as a gasoline-burning engine, a fuel input mechanism, such as a fuel injection assembly, for supplying fuel to the engine, and a spark-generating mechanism, such as sparkplugs and a timing controller, for igniting the fuel within the engine. The instant invention is characterized by including a control mechanism for controlling at least one of the fuel inputs and the timing of the spark-generating mechanism at predetermined values, which result in the substantially straight line plot of the common log of the BMEP against the common log of the fuel consumption of the assembly extending linearly with a constant slope at the operating rpm. The control mechanism can be an on-board computer programmed in accordance with the instant invention for controlling the fuel input, either type or state of fuel, amount or time when fuel is added, and spark-generating mechanism so that at each operating rpm of the engine, the common log of the BMEP plotted against the common log of fuel consumption is a straight line plot.

The principle of the instant invention can be applied to turbine engines, jet engines and other applications, such as household furnaces. Thusly, a two-fold goal is accomplished by increasing efficiency of common, high fuel-consuming engines and decreasing emittance of pollutants from high pollution-emitting engines.

The instant invention has been described in an illustrative manner and is to be understood that the terminology which has been used is intended to be in the nature of words of description rather than limitation.

Obviously, any modifications and variations of the present invention are possible in light of the above teachings. Therefore, it will be understood that the invention may be practiced otherwise than as specifically described within the scope of the appended claims.

The embodiments of the invention in which an exclusive property or privilege is claimed are defined as follows:

1. A method of characterizing an efficiently running internal combustion engine of the type having fuel input means for supplying various degrees of fuel consumption at various torque loads placed upon the engine and spark-generating means for providing a spark to ignite the fuel at various timing intervals, said method comprising the steps of; operating an engine at a constant rpm while increasing the torque load on the engine, measuring the torque value at predetermined intervals of torque load to obtain a brake mean effective pressure for each of said intervals, measuring the fuel consumption at said predetermined intervals, plotting the common log of the brake mean effective pressure against the common log of the fuel consumption for each interval to obtain a straight line curve (10) which extends linearly with a constant first slope to a D-point coordinate (16) and after which continues at a different second slope, and plotting a straight line extension (20) having the first slope and extending upwardly from the D-point coordinate (16).

2. A method as set forth in claim 1 further characterized by operating an engine at a series of constant rpms and measuring the engine torque and fuel consumption at each of the constant rpms.

3. A method as set forth in claim 1 further characterized by measuring fuel consumption in cubic millimeters of fuel per cubic inch of cylinder volume.

* * * * *